(12) United States Patent
Graveleau (10) Patent No.: US 9,809,474 B2
(45) Date of Patent: Nov. 7, 2017

(54) PROCESS FOR TREATING EFFLUENTS CONTAINING NITROGEN IN AMMONIUM FORM, AND EQUIPMENT FOR IMPLEMENTING THIS PROCESS

(71) Applicant: DEGREMONT, Paris la Defense (FR)

(72) Inventor: Laure Graveleau, Fresnes (FR)

(73) Assignee: SUEZ INTERNATIONAL (FR)

( * ) Notice: Subject to any disclaimer, the term of this patent is extended or adjusted under 35 U.S.C. 154(b) by 69 days.

(21) Appl. No.: 14/761,639

(22) PCT Filed: Jan. 16, 2014

(86) PCT No.: PCT/IB2014/058331
§ 371 (c)(1),
(2) Date: Jul. 17, 2015

(87) PCT Pub. No.: WO2014/111878
PCT Pub. Date: Jul. 24, 2014

(65) Prior Publication Data
US 2015/0360981 A1     Dec. 17, 2015

(30) Foreign Application Priority Data
Jan. 18, 2013   (FR) ...................................... 13 50447

(51) Int. Cl.
*C02F 3/00*    (2006.01)
*C02F 3/30*    (2006.01)
(Continued)

(52) U.S. Cl.
CPC .............. *C02F 3/02* (2013.01); *C02F 3/006* (2013.01); *C02F 3/12* (2013.01); *C02F 3/1263* (2013.01);
(Continued)

(58) Field of Classification Search
CPC .. C02F 3/02; C02F 3/006; C02F 3/307; C02F 3/301; C02F 3/1263; C02F 3/00;
(Continued)

(56) References Cited

U.S. PATENT DOCUMENTS

| | | | | |
|---|---|---|---|---|
| 4,376,701 A | * | 3/1983 | Fujimoto | ................ C02F 3/006 210/101 |
| 2010/0303695 A1 | | 12/2010 | Ospina | |
| 2013/0256217 A1 | | 10/2013 | Lemaire et al. | |

FOREIGN PATENT DOCUMENTS

| | | |
|---|---|---|
| WO | 2009080912 | 7/2009 |
| WO | 2012085288 | 6/2012 |

OTHER PUBLICATIONS

Corresponding International Search Report for PCT/IB2014/058331 dated Apr. 28, 2014.

* cited by examiner

*Primary Examiner* — Nam Nguyen
*Assistant Examiner* — Julia Wun
(74) *Attorney, Agent, or Firm* — The Belles Group, P.C.

(57) ABSTRACT

Process for treating effluents containing nitrogen in ammonium form, using a sequential biological reactor (1), according to which: a volume of effluents to be treated in one complete cycle is introduced into the biological reactor in one or more successive fractions by volume, each fraction by volume being treated during a subcycle; each subcycle comprises a phase of feeding with a fraction by volume, and at least a first aerated step, during which total or partial oxidation of the ammonium to nitrites takes place by injection of air or of oxygen into the effluent, a settling out and emptying step taking place after the end of the complete cycle; the weight of N—$NH_4$ to be treated is determined from the volume of effluents in the reactor at the end of the feeding phase, and from the difference between the initial N—$NH_4$ concentration in the reactor and a concentration desired at the end of the aerated step, a maximum aeration time TM is dedicated to the aerated step, and an initial air flow rate Qairinit, for the beginning of the aerated step, is (Continued)

determined by taking into account the weight of N—NH$_4$ to be treated and the maximum aeration time TM.

9 Claims, 3 Drawing Sheets

(51) Int. Cl.
*C02F 3/02* (2006.01)
*C02F 3/26* (2006.01)
*C02F 3/12* (2006.01)
C02F 101/16 (2006.01)

(52) U.S. Cl.
CPC ............... *C02F 3/26* (2013.01); *C02F 3/30* (2013.01); *C02F 3/301* (2013.01); *C02F 3/302* (2013.01); *C02F 3/307* (2013.01); C02F 2101/16 (2013.01); C02F 2209/14 (2013.01); C02F 2209/15 (2013.01); C02F 2209/40 (2013.01); C02F 2209/42 (2013.01); C02F 2209/44 (2013.01); *Y02W 10/15* (2015.05)

(58) Field of Classification Search
CPC ...... C02F 3/30; C02F 3/26; C02F 3/12; C02F 3/302; C02F 3/308; C02F 2209/42; C02F 2209/44; C02F 2209/15; C02F 2209/14; C02F 2209/40; C02F 9/00; C02F 2101/16; Y02W 10/15
USPC .............. 210/614, 903, 605, 96.1, 630, 138; 422/105, 108, 116
See application file for complete search history.

PROCESS FOR TREATING EFFLUENTS CONTAINING NITROGEN IN AMMONIUM FORM, AND EQUIPMENT FOR IMPLEMENTING THIS PROCESS

PRIORITY

Priority is claimed as a national stage application, under 35 U.S.C. §371, to international patent application No. PCT/IB2014/058331, filed Jan. 16, 2014, which claims priority to French patent application FR1350447, filed Jan. 18, 2013. The disclosures of the aforementioned priority applications are incorporated herein by reference in their entirety.

The invention relates to a process for treating effluents containing nitrogen in ammonium form, employing a sequential bioreactor, said process being of the type according to which:

a volume of effluents to be treated in a complete cycle is introduced into the bioreactor, in one or more successive volume fractions, each volume fraction being treated during a subcycle, each subcycle comprises a phase of supply with a volume fraction, and at least one first aerated step, during which total or partial oxidation of the ammonium to nitrites takes place by injection of air or oxygen into the effluent, a decanting and emptying step takes place after the end of the complete cycle.

Generally, in each subcycle, the first aerated step is followed by a second unaerated step, in anoxic conditions, during which the nitrites produced and the ammonium are converted to gaseous nitrogen by deammonification, without supply of carbon-containing substrate.

Treatment of ammonium by nitrification and deammonification represents a fairly recent treatment route that is particularly interesting owing to the energy savings that it generates relative to a more conventional treatment by nitrification and denitrification.

Such a treatment is proposed in international patent application WO 2009/080912, according to which regulation of aeration during the partial nitrification step is based on maximum and minimum settings for dissolved oxygen in the effluent contained in the bioreactor.

Experience in starting the partial nitrification step showed that it was desirable to make improvements to the control of this step in order to control it more quickly. It is also desirable to improve control of the efficiency of the unaerated step in anoxic conditions.

The invention aims in particular to improve the regulation and control of the reactions of partial nitrification and of deammonification in a sequential bioreactor. These two reactions, carried out successively, allow thorough treatment of the ammonia nitrogen while reducing the consumption of energy whether it is in the form of oxygen or of external carbon.

Each of these two reactions requires specific conditions in order to guarantee complete treatment in an industrial context where there are large risks of deviation.

According to the invention, the process for treating effluents containing nitrogen in ammonium form, of the kind defined above, is characterized in that:

the weight of N—$NH_4$ to be treated is determined from the volume of effluents in the reactor at the end of the supply phase, and from the difference between the initial concentration of N—$NH_4$ in the reactor and a desired concentration at the end of the aerated step, a maximum aeration time $T_M$ is dedicated to the aerated step, and an initial air flow rate $Qair_{init}$, for the start of the aerated step, is determined taking into account the weight of N—$NH_4$ to be treated and the maximum aeration time $T_M$.

The initial air flow rate $Qair_{init}$ is determined from the following formula:

$$Qair_{init} = k \times \text{weight of N—NH}_4 \text{ to be treated} \times 60/T_M$$

where:

$Qair_{init}$=initial air flow rate to be applied, in $Nm^3/h$ (normal $m^3$ per hour)

k=coefficient between 0.1 and 0.5 weight of N—$NH_4$ to be treated, expressed in grams $T_M$ expressed in minutes and, in the case of injection of oxygen, the oxygen flow rate is deduced from $Qair_{init}$ and the oxygen content of the air.

The time $T_M$ is fixed as a function of the total cycle time of the sequential bioreactor SBR and the number of subcycles. In general, the aeration time represents approximately 30% of the total cycle time of 8 hours comprising 4 subcycles.

The value of k is estimated experimentally as a function of the activity of the bacteria and the concentration of suspended matter (SM) in the effluent contained in the reactor.

Preferably, during the aerated step, the calculation of the air flow rate $Q_{air}$ is adjusted throughout the remaining period of aeration as a function of the value of the residual oxygen concentration. Advantageously, the concentration of dissolved residual oxygen is maintained in a defined range, notably between 0.1 mg $O_2$/L and 0.6 mg $O_2$/L.

The aeration condition, i.e. operation of the equipment for supply of air or of oxygen, is maintained until the desired concentration of N—$NH_4$, or minimum concentration, is reached, or until the maximum aeration time $T_M$ is reached.

The desired N—$NH_4$ concentration at the end of the aerated step is preferably between 40% and 60% of the initial concentration N—$NH_4$ concentration.

The coefficient k is advantageously selected with an average value between 0.1 and 0.25.

Generally, in each subcycle, the first aerated step is followed by a second unaerated step, in anoxic conditions, during which the nitrites produced and the ammonium are converted to gaseous nitrogen by deammonification, without supply of carbon-containing substrate.

To prevent biological reactions occurring during the decanting and emptying steps, the last subcycle may be carried out taking into account the results of the preceding subcycles:

if the feed admitted during the preceding subcycles has been treated completely, the evaluation being based on the ammonium concentration at the end of the penultimate subcycle, which preferably must be less than or equal to 5 mg/L (minimum value reflecting good treatment, compatible with the measurement sensitivity), a new ammonium feed is introduced during the supply step of the last subcycle for treatment, in aeration and then in anoxic conditions, whereas if the feed admitted during the preceding subcycles has only been treated partially, and the residual ammonium concentration is high, preferably above 5 mg/L, the last subcycle is used for treating this residual feed, without a supply phase.

The invention also relates to plant for treating effluents containing ammonium employing the process defined above, comprising a sequential bioreactor, and a set of equipment associated with the reactor comprising:
- a device for supplying the bioreactor with effluent, in one or more successive volume fractions,
- aerating means positioned at the bottom of the reactor and connected to a source of air or oxygen under pressure,
- at least one mechanical stirring means, in the reactor,
- a system for evacuating treated water, from the reactor,
- a system for extracting excess sludge,
- and various sensors situated in the effluent to be treated in order to determine the nitrogen feed to be treated and the number of treatment sequences to be carried out, characterized in that it comprises:
- at least one sensor for measuring the ammonium concentration $N-NH_4$ in the sequential bioreactor,
- and a calculating means:
  - for taking into account a maximum aeration time $T_M$ dedicated to the aerated step,
  - for determining the weight of $N-NH_4$ to be treated from the volume of effluents in the reactor at the end of the supply phase, and from the difference between the initial concentration of $N-NH_4$ in the reactor and a desired concentration at the end of the aerated step,
  - and for determining an initial air flow rate $Qair_{init}$ for the start of the aerated step taking into account the weight of $N-NH_4$ to be treated and the maximum aeration time $T_M$.

The calculating means is programmed for determining an initial air flow rate $Qair_{init}$ according to the following formula:

$$Qair_{init} = k \times \text{weight of } N-NH_4 \text{ to be treated} \times 60/T_M$$

where:
$Qair_{init}$=initial air flow rate to be applied, in $Nm^3/h$ (normal $m^3$ per hour)
k=coefficient between 0.1 and 0.5, preferably between 0.1 and 0.25
weight of $N-NH_4$ to be treated, expressed in grams
$T_M$ expressed in minutes
and, in the case of injection of oxygen, the oxygen flow rate is deduced from $Qair_{init}$ and the oxygen content of the air.

Apart from the arrangements disclosed above, the invention consists of a certain number of other arrangements, which will be discussed more explicitly below with respect to embodiment examples described with reference to the appended drawings, which are not in any way limiting. In these drawings.

Figure 1:
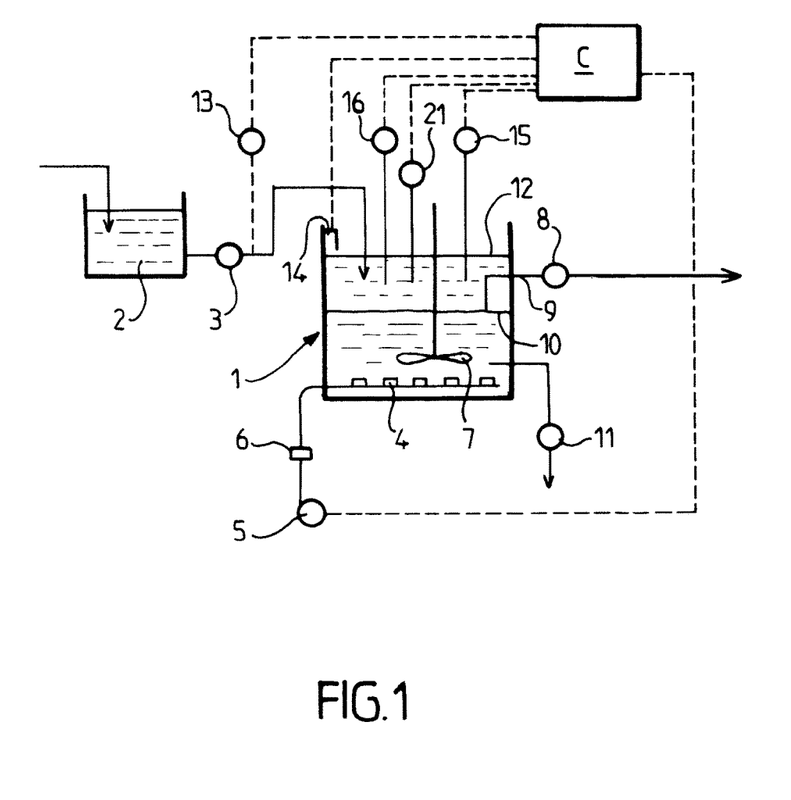
FIG. 1 is a schematic vertical section through a plant for carrying out the process according to the invention with a sequential bioreactor.

Referring to FIG. 1 of the drawings, this shows a plant for treating ammonium by nitrification and deammonification, which comprises a sequential bioreactor 1, in the form of a tank, with, upstream, a buffer tank 2, in which effluent to be treated is stored, if necessary.

The plant also comprises:
- a device 3 for supplying the bioreactor with effluents, in particular in the form of a pump whose intake is connected to the bottom of tank 2 and whose delivery goes into a pipe that opens into reactor 1;
- aerating means 4, notably formed from nozzles, positioned at the bottom of the reactor 1 and connected to a source of air under pressure 5 via a solenoid valve 6.

As a variant, the aerating means 4 could inject oxygen, or oxygen-enriched air, into the reactor.

At least one mechanical stirring means 7 is provided in reactor 1. Evacuation of the treated water, from reactor 1, is provided by a system notably consisting of a pump 8 and a pipe 9 forming a plunger tube to a level 10 in the reactor.

A system for extracting excess sludge comprises a pump 11, whose intake is connected to the lower part of the reactor, and whose delivery goes into a discharge pipe.

In reactor 1, the fractions of effluents to be treated are delivered either in one go, or preferably successively by means of the device 3. They are added to the biological volume of the reactor, defined by a minimum level 10, until a maximum level 12 is reached. The hydraulic volume admitted during a treatment cycle corresponds to the difference between the maximum level 12 and the minimum level 10. This hydraulic volume is poured in successive fractions, corresponding to the different treatment sequences or subcycles.

After carrying out a treatment cycle, and a decanting step at the end, emptying of the treated water is provided by the dedicated evacuating system 8, which effects the adjustment from level 12 to level 10. The sludge produced in excess is evacuated, if necessary, at the end of the treatment cycle by means of system 11.

The plant further comprises a flowmeter 13 installed on the delivery of pump 3 to make it possible to calculate, with time measurement in parallel, the volume of effluents injected into reactor 1 for each subcycle. Reactor 1 is equipped with a detector 14 of the level of the effluent, making it possible to determine the volume of effluents in reactor 1.

A sensor or probe 15 is installed in the reactor, for immersing in the effluent, to measure its ammonium concentration $N-NH_4$. The probe 15 may consist of an ammonium analyzer, or a selective membrane probe.

At least one sensor 16 is provided in reactor 1 for measuring the concentration of dissolved oxygen $O_2$ in the effluent. Other sensors may be provided for determining the conductivity of the effluent, the temperature and/or the pH in reactor 1, and, if applicable, in the storage tank 2, in the treated water, and in the discharge water.

The various sensors are connected to calculating means consisting of a computer or controller C that integrates the measurements in real time and allows the treatment cycles to proceed automatically.

Figure 4:
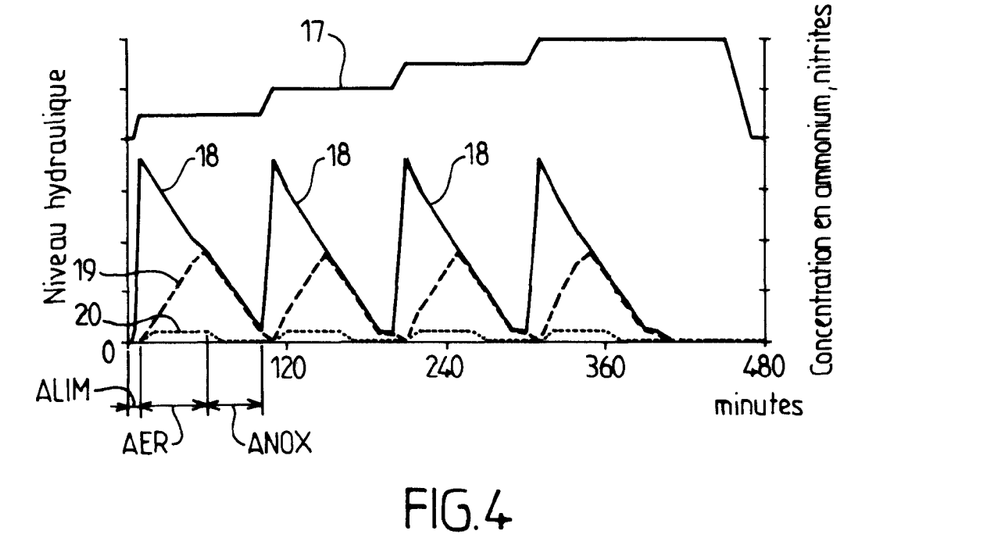
FIG. 4 is a diagram illustrating four successive subcycles, during which feed of ammonium supplied in the supply step has been treated at the end of the subcycle.

Treatment of the effluents is illustrated by the diagram in FIG. 4, where the time in minutes is plotted on the abscissa, and the hydraulic level in reactor 1 is plotted on the ordinate axis on the left. This hydraulic level is illustrated by the stepped solid curve 17. The following are plotted on the ordinate on the right: the ammonium concentration, illustrated by the sawtooth solid curves 18; the concentration of nitrites, illustrated by the dashed curves 19. The aeration phases are illustrated by the curves with dotted lines 20.

The diagram in FIG. 4 corresponds to the treatment of a volume of effluents of a complete cycle with four subcycles corresponding to introduction of four successive volume fractions into reactor 1.

Each subcycle comprises a supply phase indicated by the segment SUP for the first sawtooth 18; a first aerated step indicated by the segment AER, during which oxidation of the ammonium to nitrites takes place, by injection of air or oxygen into the effluent in reactor 1; a second unaerated step indicated by the segment ANOX during which the nitrites produced and the ammonium are converted to gaseous nitrogen.

The hydraulic level 17 increases by one step, as shown in FIG. 4, at each introduction of a volume fraction. At the end of a cycle, the volume treated is evacuated and the hydraulic level returns to the starting level.

The processes for treating ammonium based on reactions of partial nitrification and of deammonification employ two distinct, very different reactions, presented below.

Partial Nitrification

This transformation of ammonium to nitrites takes place in the nonlimiting presence of oxygen by nitrifying bacteria (AOB), according to the equation:

Reaction of Deammonification

This transformation takes place according to the equation:

It can be seen from the equations that the first reaction converts ammonium $NH_4$ into nitrites $NO_2$, whereas the second reaction combines the ammonium and the nitrites to form gaseous nitrogen $N_2$ and nitrates $NO_3$.

The yield of the first reaction depends on several elements, including:
the activity of the bacteria involved,
the presence of oxygen,
the concentration of $NH_4$, and
absence of inhibitor.

The yield of the second reaction depends on several elements, including:
the activity of the bacteria involved,
the environmental conditions, in particular absence of free oxygen, sufficient alkalinity,
the concentration of the two substrates $NH_4$ and $NO_2$, and absence of inhibitor.

Regarding the concentration of the two substrates $NH_4$ and $NO_2$, it is necessary, on the one hand, for these substrates to be in sufficient concentration, and on the other hand, they should be in satisfactory relative concentration to allow their complete removal. It may be seen, from the deammonification equation, that it is necessary for the $NO_2/NH_4$ molar ratio to be of the order of 1.32.

The desired N—$NH_4$ concentration at the end of the aerated step is preferably between 40% and 60% of the initial N—$NH_4$ concentration. The concentration at the end of the step is governed by the stoichiometry of the deammonification reaction, which requires 1.32 $NO_2$ for 1 $NH_4$; the nitrogen of $NO_2$ represents 0.56% of the total nitrogen N, hence the percentage between 40 and 60%. We may wish to have a little more or a little less, depending on whether it is preferred to be limiting in $NH_4$ or $NO_2$.

The desired N—$NH_4$ concentration at the end of the aerated step is preferably between 40% and 60% of the initial N—$NH_4$ concentration.

In the case of a process providing treatment of ammonium according to the two reactions corresponding to the equations given above, the importance of good regulation of the two corresponding steps is noted.

According to the process of the invention, this control of ammonium treatment is obtained by fine dynamic regulation of the supply of air, or of oxygen.

Regulation is provided in order to satisfy several conditions, including the following:
allow partial nitrification, i.e. not allow oxidation of the nitrites to nitrates,
make it possible to reach, at the end of the aerated step, the ratio: $NO_2$ produced/residual $NH_4$ satisfying the conditions of the deammonification reaction.

In the case when the treatment of ammonium is carried out in a sequential bioreactor or SBR, all of the treatment steps are carried out within one and the same reactor, providing for the first time the function of treatment, aerated step and/or unaerated step in anoxic conditions, and the function of decanting/emptying.

To facilitate the conditions of operation of such a reactor, it is advantageous to operate with fixed periods of time for each of these steps or phases, these periods of time being determined depending on the treatment aim.

The invention aims to establish rules for operation of such a reactor SBR, and the settings for satisfying the treatment conditions. Regulation relates both to the first aerated step, and to the second unaerated step, in anoxic conditions.

Regulation of the First Aerated Step

This aerated step follows a phase of supply of effluents to be treated. When this step is started, the charge to be treated is a function of the initial concentration of the effluent in reactor 1 and of the volume admitted in the supply phase. These two parameters are varied over time.

The weight, or charge, of N—$NH_4$ to be treated, in the aerated step, is determined from the volume of effluent contained in reactor 1 at the end of the supply phase, and from the difference between the initial concentration of N—$NH_4$ of the effluent in reactor 1, and a desired concentration at the end of the aerated step, for which a maximum aeration time $T_M$ is dedicated.

The volume of effluent contained in the reactor is determined from the effluent level supplied by the level detector 14.

The ammonium concentration of the effluent in reactor 1 is estimated either manually by taking a sample and laboratory analysis, or preferably by the in-line sensor 15. Depending on the treatment aim, the desired concentration to be reached at the end of the period of aeration is determined by an operator. This concentration may be between 40% and 60% of the initial concentration of N—$NH_4$.

The maximum aeration time $T_M$ is selected by the operator who is carrying out the treatment, and is generally between 30 and 45 minutes.

The initial air flow rate $Qair_{init}$ is then determined from the formula:

$$Qair_{init} = k \times \text{weight of N—NH}_4 \text{ to be treated} \times 60/T_M$$

$Qair_{init}$ is expressed in $Nm^3/h$

The weight of N—$NH_4$ to be treated is expressed in grams.

The time $T_M$ is expressed in minutes.

The value of the coefficient k is between 0.1 and 0.5, preferably with an average value between 0.1 and 0.25.

In the case when oxygen is injected instead of air, the oxygen flow rate is deduced from the calculated air flow rate $Q_{air}$, applying a reduction factor corresponding to the oxygen content of the air, and this reduction factor may be taken as equal to 0.21. In the case of oxygen-enriched air, the reduction factor will be adapted to the oxygen concentration.

The aeration condition, which corresponds to operation of the equipment 4 for supply with air, is maintained until a minimum concentration of N—NH$_4$ is reached, or until the maximum aeration time $T_M$ is reached.

During the aerated step, the calculation of the air flow rate $Q_{air}$ is adjusted throughout the remaining period of aeration as a function of the value of the residual oxygen concentration. Advantageously, the concentration of dissolved residual oxygen is maintained in a defined range, notably between 0.1 mg O$_2$/L and 0.6 mg O$_2$/L.

If the value of the concentration of dissolved oxygen, supplied by the sensor 16, is outside of the range between the minimum value and the maximum value, the air flow rate is adjusted as a function of the maximum and minimum oxygen concentrations. The air flow rate $Q_{air}$ is decreased when the value of the concentration of dissolved oxygen is above the max. set value, whereas the air flow rate $Q_{air}$ is increased when the value of the concentration of dissolved oxygen is below the min. set value.

Depending on the operating mode selected by the operator, the weight of N—NH$_4$ to be treated can be estimated as a percentage of the weight present in reactor 1 at the end of the period of supply, or may be of a fixed magnitude (in the case of an effluent having a concentration that is stable over time).

Reactor 1 is advantageously equipped with a sensor 21 for measuring the concentration of nitrates. This sensor 21 may be an in-line analyzer or a selective membrane probe. The information supplied concerning the concentration of nitrates is used for adjusting the setting for residual oxygen during the aerated step.

The air supplied is used for oxidation of the ammonium to nitrites, but high concentrations of dissolved oxygen may in certain conditions promote oxidation of the nitrites to nitrates, which is to be avoided in the case of treatment by partial nitrification deammonification. This may be the case, in particular, in the phase of starting the process, when the activity of the nitrifying bacteria, producing nitrates, may be substantial. Their activity will be reduced by a low residual oxygen concentration, preferably below 0.6 mg O$_2$/L during the aerated step.

The concentration of nitrates may be utilized for modifying the setting for residual oxygen. For this purpose, the concentration of nitrates at the start of the aerated step is recorded, and then is compared regularly with the average value of nitrates measured during the aerated step. If a significant difference is observed between the average value at a time point of the treatment in the aerated step, and the initial value of the concentration of nitrates, the maximum residual oxygen setting is reduced by a value of 0.1 mg/L. A difference is regarded as significant when it corresponds to an increase in the concentration of nitrates of at least 2 mg/L after 10 minutes of aeration (related to the sensitivity of the in-line sensor).

Figure 2:
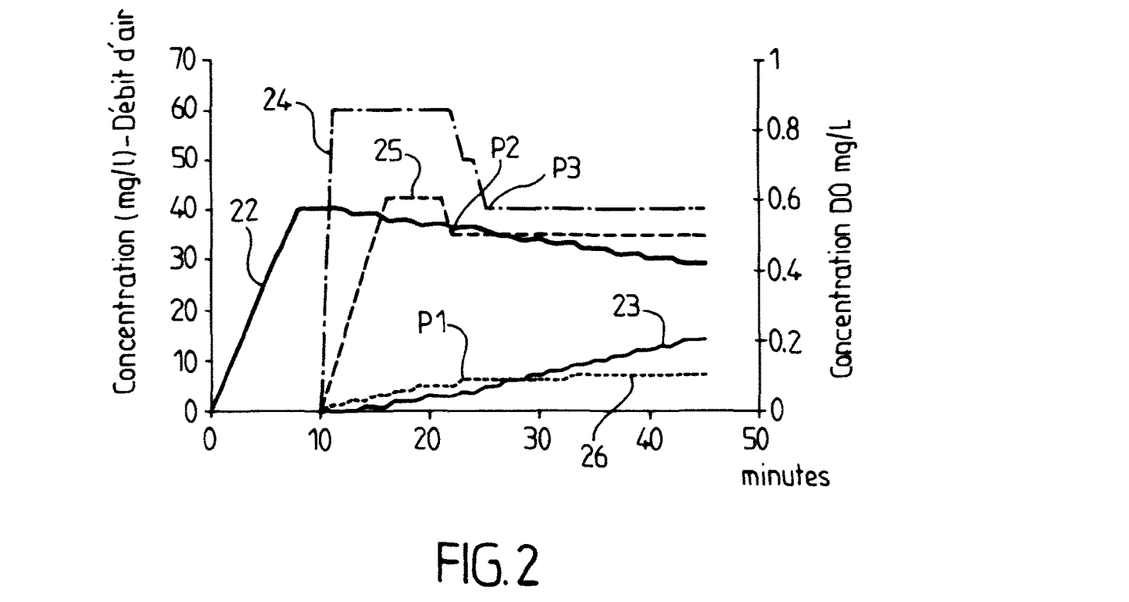
FIG. 2 is a diagram illustrating the variations in concentrations of $N-NH_4$, $N-NO_2$, $N-NO_3$, the air injection rate and concentration of dissolved oxygen in the reactor, as a function of time on the abscissa.

The complete regulation scheme is presented in the diagram in FIG. 2.

Starting the Partial Nitrification

In the diagram in FIG. 2, the concentrations in mg/L for N—NH$_4$, N—NO$_2$, and N—NO$_3$ are plotted on the ordinate, on the scale on the left; the flow rate of injected air is also plotted on the ordinate, but without indication of values as the range of air flow rate will depend on the volume of the reactor; for information, for a volume to be treated of 1 m$^3$, the range of air flow rate would be of the order of 4 to 6 Nm$^3$/h.

The time expressed in minutes is plotted on the abscissa.

The concentrations in mg/L of dissolved oxygen DO are plotted on the ordinate on the right.

The variations of the concentration of N—NH$_4$ are represented by the solid curve 22; the variations of the concentration of nitrites N—NO$_2$ are represented by the solid curve 23; the variations of the air flow rate in Nm$^3$/h are represented by the dot-and-dash curve 24; the variations of the concentration of dissolved oxygen are represented by the dashed curve 25; and the variations of the concentration of nitrates N—NO$_3$ are represented by the dashed curve 26.

Curve 22 of the concentration of N—NH$_4$ has an initial ascending portion corresponding to the phase of supply of the reactor with a fraction of effluents to be treated. Injection of air, illustrated by curve 24, causes, with a slight delay, a decrease in the concentration of N—NH$_4$ and an increase in the concentration of nitrites N—NO$_2$, illustrated by curve 23.

After a certain aeration time, the concentration of nitrates NO$_3$ at point P1 exceeds a maximum permissible value of about 4 mg/L, which reflects excessive air supply for the plant for partial nitrification.

Consequently, the maximum setting for dissolved oxygen is reduced, according to point P2, which leads to reduction of the flow rate of injected air, at point P3. This corrective action makes it possible to reduce the level of formation of nitrates.

Regulation of the Production of Nitrites

Figure 3:
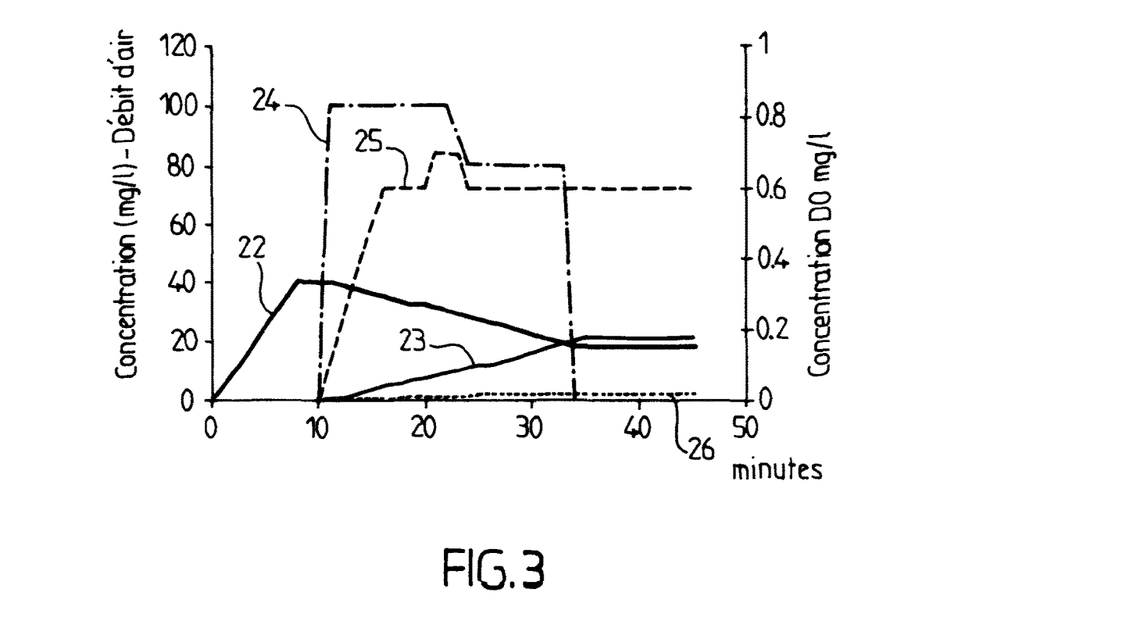
FIG. 3 is a diagram similar to that of FIG. 2 for the same compounds, illustrating regulation of the production of nitrites.

The diagram in FIG. 3 illustrates, similarly to FIG. 2, with the same quantities plotted on the ordinate and with time plotted on the abscissa, an example of regulation of the production of nitrites.

At the end of the period of supply, the concentration of N—NH$_4$ corresponding to the maximum of curve 22 is used for:
  determining the initial air flow rate $Qair_{init}$ to be applied during the aerated step,
  determining the desired N—NH$_4$ concentration at the end of the aerated step, or "target concentration"; when this concentration is reached, aeration will be stopped.

Moreover, the air flow rate is adjusted as a function of the concentration of residual oxygen or dissolved oxygen.

From the diagram in FIG. 3, it appears that the initial concentration of N—NH$_4$ is about 40 mg/L. Toward the end of the aerated step, this concentration is about 20 mg/L, whereas the concentration of nitrites N—NO$_2$ is slightly higher, roughly 24 mg/L.

The concentration of dissolved oxygen is maintained at about 0.6 mg/L before and after a gap at about 0.7 mg/L. The concentration of nitrates is maintained at a reduced level, below 2 mg/L.

Regulation of the Unaerated Step, in Anoxic Conditions

A deviation sometimes observed with biological treatment processes occurs because some of the reactions could not take place during the treatment phase, which leads to disturbances during the phase of decanting/emptying of the treated water.

Such is the situation in particular when the reactions produce substrates in gaseous form, which leads to floating up of the suspended matter during the decanting phase and discharge thereof with the treated water.

In the case of a process for treatment of ammonium by partial nitrification and deammonification, the last unaerated step, in anoxic conditions, permits consumption of the ammonium and of the nitrites, and production of dinitrogen (in gaseous form) and nitrates (in soluble form).

According to the cycle of the SBR reactor, the treatment steps, aerated step and unaerated step, may be collected together in a single period (or 1 subcycle) or fractionated in several subcycles, each subcycle comprising a supply phase and the two treatment steps, aerated and unaerated in anoxic conditions.

This configuration offers several advantages and the invention supplies an improvement to this type of operation.

The reaction employed in the unaerated step, in anoxic conditions, consumes two kinds of nitrogen, ammonium and nitrites according to a known stoichiometry with $NO_2/NH_4$ molar ratio close to 1.5. The reaction is stopped when one of the two substrates is consumed completely. In this case, it is quite often the nitrites that are limiting, as they are in fact produced by the biological activity of the nitrifying bacteria, depending on the operating conditions of the process.

The invention supplies an improvement to prevent biological reactions taking place during the decanting and emptying steps.

For this, the last treatment step, in particular the last subcycle of a treatment cycle, is carried out taking into account the results of the preceding subcycles. Evaluation of these results is based on the ammonium concentration of the effluent in reactor 1 at the end of the penultimate subcycle.

If, at the end of the penultimate subcycle, the concentration of N—$NH_4$ is low enough, notably below 5 mg/L, it appears that the N—$NH_4$ feed admitted during the preceding subcycles was treated almost completely; the last subcycle may therefore treat a new fraction of effluents laden with ammonium, which will be delivered by a usual supply phase, and then treated by the aerated step and the unaerated step.

This configuration corresponds to that of the diagram in FIG. 4. At the end of the third subcycle, the concentration of ammonium N—$NH_4$ corresponding to the bottom end of the third sawtooth 18 is below the desired limit, and a fourth subcycle is triggered, similar to the preceding subcycle, with supply of a fraction of effluents to be treated.

Figure 5:
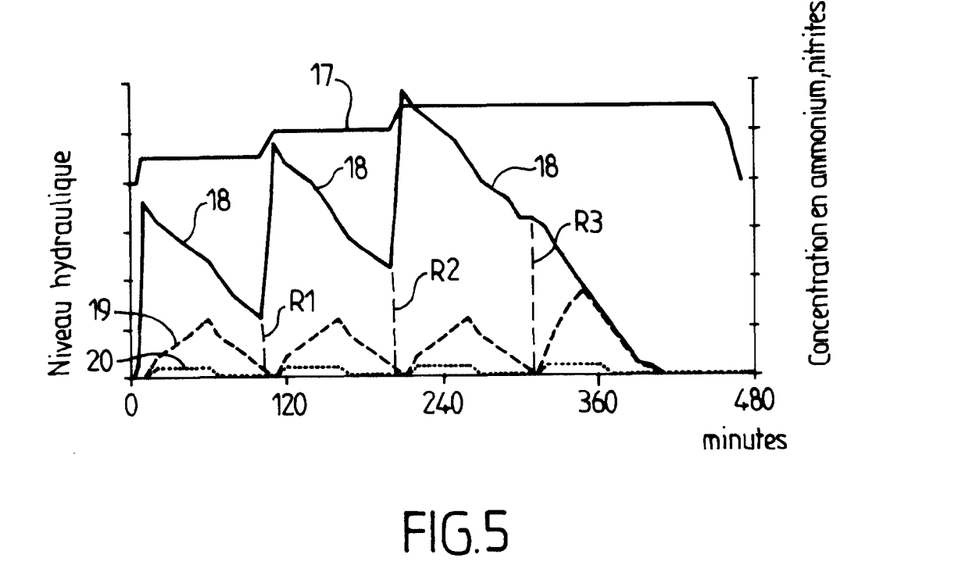
FIG. 5 is a diagram illustrating three successive subcycles, during which the ammonium feed has not been treated completely, and a fourth subcycle for treating the remainder of the ammonium feed.

In contrast, if the N—$NH_4$ feed admitted during the preceding subcycles has only been treated partially, as illustrated by the diagram in FIG. 5, at the end of each subcycle a residual charge R1, R2, R3 of ammonium is still present. This residual charge increases from one subcycle to the next. Measurement of the ammonium concentration at the end of the third subcycle reveals a relatively large residual charge R3, above the desired limit, for example of 5 mg/L. For the last subcycle, no phase of supply with effluents to be treated will take place, but the aerated step, followed by the unaerated step, will be applied to the residual charge R3 to give, at the end of the last subcycle, a reduced concentration of ammonium, preferably below 5 mg/L.

The invention applies to the treatment of effluents laden with ammonium by partial nitrification, whether or not coupled to a deammonification step.

The invention may relate to any effluent containing ammonium.

The invention claimed is:

1. A process for treating effluents containing nitrogen in ammonium form, employing a sequential bioreactor, wherein said process comprises:
   introducing into the bioreactor in one or more successive volume fractions a volume of effluents to be treated in a complete cycle,
   treating each volume fraction during a subcycle, the subcycle comprising:
   supplying in a supply phase one of the volume fractions to the bioreactor,
   determining, at an end of the supply phase, an initial concentration of N—$NH_4$ in the bioreactor,
   setting a desired concentration of N—$NH_4$ in the bioreactor to be reached by an end of an aerating step,
   determining the weight of N—$NH_4$ to be treated from the volume of effluents in the bioreactor by the end of the supply phase, and from the difference between the initial concentration of N—$NH_4$ in the bioreactor and the desired concentration of N—$NH_4$ in the bioreactor to be reached by the end of the aerating step,
   setting a maximum aeration time $T_M$ for the aerating step,
   determining an initial air flow rate $Qair_{init}$ for a start of the aerating step, the initial air flow rate being determined taking into account the weight of N—$NH_4$ to be treated and the maximum aeration time $T_M$, from the following formula:

$$Qair_{init} = k \times \text{weight of N—NH}_4 \text{ to be treated} \times 60/T_M$$

where:
   $Qair_{init}$=initial air flow rate to be applied, in $Nm^3/h$ (normal $m^3$ per hour),
   k=coefficient between 0.1 and 0.5,
   weight of N—$NH_4$ to be treated, expressed in grams,
   $T_M$ expressed in minutes, and
   in the case of injection of oxygen, the oxygen flow rate is deduced from $Qair_{init}$ and the oxygen content of the air, and
   injecting air or oxygen into the effluents in the bioreactor during the aerating step starting with the determined initial air flow rate so that at least partial oxidation of the ammonium to nitrates is achieved during the aerating step, and
   decanting and emptying the bioreactor after an end of the complete cycle.

2. The process as claimed in claim 1, wherein, during the aerating step, the air flow rate is calculated and adjusted throughout the remaining period of aeration as a function of the value of the residual oxygen concentration.

3. The process as claimed in claim 1, wherein the desired N—$NH_4$ concentration to be reached by the end of the aerating step is between 40% and 60% of the initial concentration of N—$NH_4$.

4. The process as claimed in claim 1, wherein the aeration is maintained until the desired concentration of N—$NH_4$ is reached, or until the maximum aeration time $T_M$ is reached.

5. The process as claimed in claim 1, wherein the coefficient k is selected with an average value between 0.1 and 0.25.

6. The process as claimed in claim 1, wherein, in the subcycle, the aerating step is followed by an unaerating step, in anoxic conditions, during which the nitrites produced and the ammonium are converted to gaseous nitrogen by deammonification, without supply of carbon-containing substrate.

7. The process as claimed in claim 6, wherein the last subcycle is carried out taking into account the results of the preceding subcycles:
   if the feed admitted during the preceding subcycles has been treated almost completely, the evaluation being based on the ammonium concentration at the end of the penultimate subcycle, which is less than or equal to 5 mg/L, a new ammonium feed is introduced during a supply phase of the last subcycle, for treatment in aeration and then in anoxic conditions, whereas if the feed admitted during the preceding subcycles has only been treated partially, and the residual ammonium concentration is high, above 5 mg/L, the last subcycle is used for treating this residual feed, without a supply phase.

8. A plant for treating effluents containing ammonium, the plant comprising a sequential bioreactor, and a set of equipment associated with the bioreactor comprising:
   a device for supplying the bioreactor with effluents, in one or more successive volume fractions,
   aerating means positioned at the bottom of the bioreactor and connected to a source of air or oxygen under pressure,
   at least one mechanical stirring means, in the bioreactor,
   a system for evacuation of the treated water, from the bioreactor,
   a system for extraction of excess sludge,
   various sensors situated in the effluents to be treated in order to determine the ammonium to be treated and the number of treatment sequences to be carried out,
   at least one sensor for measuring the ammonium concentration $N-NH_4$ in the sequential bioreactor,
   and a calculating means for controlling the aerating means in an aerating step by:
      determining a maximum aeration time $T_M$ dedicated to the aerating step,
      determining the weight of $N-NH_4$ to be treated from the volume of effluents in the bioreactor by the end of the supply phase, and from the difference between the initial concentration of $N-NH_4$ in the bioreactor and a desired concentration by the end of the aerating step, and
      determining an initial air flow rate $Qair_{init}$, for the start of the aerating step taking into account the weight of $N-NH_4$ to be treated and the maximum aeration time $T_M$, from the following formula:

$$Qair_{init} = k \times \text{weight of } N-NH_4 \text{ to be treated} \times 60/T_M$$

where:
   $Qair_{init}$=initial air flow rate to be applied, in $Nm^3/h$ (normal $m^3$ per hour),
   k=coefficient between 0.1 and 0.5,
   weight of $N-NH_4$ to be treated, expressed in grams,
   $T_M$ expressed in minutes, and
   in the case of injection of oxygen, the oxygen flow rate is deduced from $Qair_{init}$ and the oxygen content of the air.

9. The plant of claim 8, wherein k=a coefficient between 0.1 and 0.25.

* * * * *